(12) United States Patent
Stephenson et al.

(10) Patent No.: US 10,220,453 B2
(45) Date of Patent: Mar. 5, 2019

(54) MILLING TOOL WITH INSERT COMPENSATION

(71) Applicant: Ford Motor Company, Dearborn, MI (US)

(72) Inventors: David Alan Stephenson, Detroit, MI (US); David Alan Ozog, Brownstown, MI (US); David Garrett Coffman, Warren, MI (US)

(73) Assignee: Ford Motor Company, Dearborn, MI (US)

( * ) Notice: Subject to any disclaimer, the term of this patent is extended or adjusted under 35 U.S.C. 154(b) by 319 days.

(21) Appl. No.: 14/928,163

(22) Filed: Oct. 30, 2015

(65) Prior Publication Data

US 2017/0120352 A1    May 4, 2017

(51) Int. Cl.
*B23C 5/24* (2006.01)
*B23C 5/10* (2006.01)
(Continued)

(52) U.S. Cl.
CPC .............. *B23C 5/2462* (2013.01); *B23C 3/02* (2013.01); *B23C 5/109* (2013.01); *B23C 5/2406* (2013.01);
(Continued)

(58) Field of Classification Search
CPC ........ B23C 2210/287; B23C 2210/325; B23C 5/2489; B23C 5/24; Y10T 407/2222;
(Continued)

(56) References Cited

U.S. PATENT DOCUMENTS

| 833,261 A | 10/1906 | Tardif |
| 1,384,456 A | 7/1921 | Eury |

(Continued)

FOREIGN PATENT DOCUMENTS

| CN | 102152084 A | 8/2011 |
| CN | 102168568 A | 8/2011 |

(Continued)

OTHER PUBLICATIONS

GB Search Report dated May 26, 2017 for corresponding GB1618212.3, 2 pages.

(Continued)

*Primary Examiner* — Nicole N Ramos
(74) *Attorney, Agent, or Firm* — Marla Johnston; Brooks Kushman P.C.

(57) ABSTRACT

A milling tool is disclosed. The milling tool may include an elongated body having a longitudinal axis and a plurality of cutting inserts. The cutting inserts may each have a cutting edge and a cutting radius and be coupled to the body and spaced along the longitudinal axis. One or more of the plurality of cutting inserts may be adjustable (e.g., mechanically adjustable) between first and second cutting radii. A difference between the first and second cutting radii may be at least 10 μm. The milling tool may include cutting inserts having a plurality of different cutting radii. The milling tool may be configured to have a length that spans an entire height of an engine bore. The cutting inserts having different radii may compensate for dimensional errors in an engine bore diameter that occur when milling a deep pocket.

20 Claims, 8 Drawing Sheets

(51) Int. Cl.
*B23C 3/02* (2006.01)
*C23C 4/02* (2006.01)
*B23B 41/12* (2006.01)

(52) U.S. Cl.
CPC .............. *B23C 5/2486* (2013.01); *C23C 4/02* (2013.01); *B23B 41/12* (2013.01); *B23B 2205/125* (2013.01); *B23C 2200/206* (2013.01); *B23C 2200/368* (2013.01); *B23C 2210/285* (2013.01); *B23C 2210/287* (2013.01); *B23C 2210/62* (2013.01); *B23C 2215/242* (2013.01); *B23C 2220/52* (2013.01); *B23C 2226/125* (2013.01); *B23C 2270/06* (2013.01)

(58) Field of Classification Search
CPC ......... Y10T 407/2244; Y10T 407/2252; Y10T 407/2254; Y10T 407/2256; Y10T 407/2262
See application file for complete search history.

(56) References Cited

U.S. PATENT DOCUMENTS

| | | | |
|---|---|---|---|
| 1,432,579 A | 10/1922 | Vauclain | |
| 2,207,909 A | 7/1940 | Besaw | |
| 2,314,902 A | 3/1943 | Shepard | |
| 2,451,089 A | 10/1948 | Hunter | |
| 2,645,003 A * | 7/1953 | Stanley | B23C 5/207 407/113 |
| 3,031,330 A | 4/1962 | Hornick et al. | |
| 3,114,960 A | 12/1963 | Einaudi | |
| 3,283,910 A | 11/1966 | Grieselhuber et al. | |
| 3,324,496 A | 6/1967 | Haracz | |
| 3,325,496 A | 6/1967 | Critchley et al. | |
| 3,759,625 A | 9/1973 | Iverson | |
| 3,798,724 A | 5/1974 | Czopor | |
| 3,833,321 A | 9/1974 | Telang et al. | |
| 3,946,474 A | 3/1976 | Hahn et al. | |
| 4,005,991 A | 2/1977 | Uebayasi et al. | |
| 4,248,915 A | 2/1981 | Vinciguerra | |
| 4,324,017 A | 4/1982 | Viehe | |
| 4,519,731 A * | 5/1985 | Jester | B23C 5/109 407/41 |
| 4,646,479 A | 3/1987 | Walker et al. | |
| 4,751,113 A | 6/1988 | Riccio et al. | |
| 4,790,693 A | 12/1988 | Koblesky | |
| 4,817,342 A | 4/1989 | Martin et al. | |
| 4,844,666 A * | 7/1989 | Tsujimura | B23C 5/003 407/34 |
| 4,854,785 A | 8/1989 | Lowe et al. | |
| 4,967,458 A | 11/1990 | Rosenberg et al. | |
| 5,050,547 A | 9/1991 | Takahashi | |
| 5,107,967 A | 4/1992 | Fujita et al. | |
| 5,194,304 A | 3/1993 | McCune, Jr. et al. | |
| 5,212,738 A | 5/1993 | Chande et al. | |
| 5,217,330 A * | 6/1993 | Dennstedt | B23B 27/1662 407/37 |
| 5,239,955 A | 8/1993 | Rao et al. | |
| 5,332,422 A | 7/1994 | Rao | |
| 5,363,821 A | 11/1994 | Rao et al. | |
| 5,380,564 A | 1/1995 | VanKuiken, Jr. et al. | |
| 5,383,750 A * | 1/1995 | Satran | B23C 5/1072 407/113 |
| 5,455,078 A | 10/1995 | Kanzaki | |
| 5,466,906 A | 11/1995 | McCune, Jr. et al. | |
| 5,480,497 A | 1/1996 | Zaluzec et al. | |
| 5,481,084 A | 1/1996 | Patrick et al. | |
| 5,549,425 A | 8/1996 | Bernadic et al. | |
| 5,597,268 A * | 1/1997 | Izumi | B23C 5/1054 407/51 |
| 5,622,753 A | 4/1997 | Shepley et al. | |
| 5,648,122 A | 7/1997 | Rao et al. | |
| 5,691,004 A | 11/1997 | Palazzolo et al. | |
| 5,723,187 A | 3/1998 | Popoola et al. | |
| 5,818,006 A | 10/1998 | Habel et al. | |
| 5,820,938 A | 10/1998 | Pank et al. | |
| 5,872,684 A | 2/1999 | Hadfield et al. | |
| 5,890,854 A * | 4/1999 | Naumann | B23B 5/28 407/34 |
| 5,922,412 A | 7/1999 | Baughman et al. | |
| 5,931,038 A | 8/1999 | Higashi | |
| 5,958,520 A | 9/1999 | Cook et al. | |
| 5,958,521 A | 9/1999 | Zaluzec et al. | |
| 5,997,286 A | 12/1999 | Hemsath et al. | |
| 6,155,753 A * | 12/2000 | Chang | B23B 27/1681 407/103 |
| 6,211,359 B1 | 4/2001 | He et al. | |
| 6,328,026 B1 | 12/2001 | Wang et al. | |
| 6,395,090 B1 | 5/2002 | Shepley et al. | |
| 6,441,619 B1 | 8/2002 | Araki et al. | |
| 6,540,448 B2 * | 4/2003 | Johnson | B23C 5/006 407/35 |
| 6,589,605 B2 | 7/2003 | Shepley et al. | |
| 6,622,685 B2 | 9/2003 | Takahashi et al. | |
| 6,856,866 B2 | 2/2005 | Nakao | |
| 6,863,931 B2 | 3/2005 | Someno et al. | |
| 6,914,210 B2 | 7/2005 | Grossklaus, Jr. et al. | |
| 7,089,662 B2 | 8/2006 | Izquierdo et al. | |
| 7,165,430 B2 | 1/2007 | Weidmer | |
| 7,172,787 B2 | 2/2007 | Torigoe et al. | |
| 7,188,416 B1 | 3/2007 | Woehlke et al. | |
| 7,220,458 B2 | 5/2007 | Hollis et al. | |
| 7,300,231 B1 | 11/2007 | Liu | |
| 7,415,958 B2 | 8/2008 | Boehm et al. | |
| 7,533,657 B2 | 5/2009 | Onodera | |
| 7,568,273 B2 | 8/2009 | Iizumi et al. | |
| 7,607,209 B2 | 10/2009 | Iizumi et al. | |
| 7,621,250 B2 | 11/2009 | Iizumi et al. | |
| 7,708,038 B1 | 5/2010 | Stewart | |
| 7,758,910 B2 | 7/2010 | Moreau et al. | |
| 7,780,381 B2 * | 8/2010 | Sjoo | B23C 5/2406 407/113 |
| 7,841,812 B2 * | 11/2010 | Kuchler | B23B 29/03421 407/37 |
| 7,851,046 B2 | 12/2010 | Nishimura et al. | |
| 7,862,404 B2 | 1/2011 | Takashima et al. | |
| 7,982,435 B2 | 7/2011 | Masuda | |
| 8,103,485 B2 | 1/2012 | Plett | |
| 8,171,910 B2 | 5/2012 | Tachibana et al. | |
| 8,209,831 B2 | 7/2012 | Boehm et al. | |
| 8,256,092 B1 | 9/2012 | Woodruff et al. | |
| 8,286,468 B2 | 10/2012 | Nishimura et al. | |
| 8,544,379 B2 | 10/2013 | Paul et al. | |
| 8,707,541 B2 | 4/2014 | Doerfler et al. | |
| 8,726,874 B2 | 5/2014 | Whitbeck et al. | |
| 8,752,256 B2 | 6/2014 | Verpoort et al. | |
| 8,833,331 B2 | 9/2014 | Schramm et al. | |
| 9,032,849 B2 | 5/2015 | Azzopardi | |
| 9,109,276 B2 | 8/2015 | Kanai et al. | |
| 9,643,265 B2 | 5/2017 | Ast et al. | |
| 2001/0018010 A1 | 8/2001 | Kichin | |
| 2002/0119016 A1 * | 8/2002 | Woodward | B23B 5/12 407/35 |
| 2003/0010201 A1 | 1/2003 | Takahashi et al. | |
| 2003/0052650 A1 | 3/2003 | Gunji | |
| 2003/0223829 A1 | 12/2003 | Meenan et al. | |
| 2004/0065290 A1 | 4/2004 | Wakade et al. | |
| 2004/0079556 A1 | 4/2004 | Cramer et al. | |
| 2005/0064146 A1 | 3/2005 | Hollis et al. | |
| 2005/0084341 A1 | 4/2005 | Long, II et al. | |
| 2005/0137829 A1 | 6/2005 | Gimelfarb et al. | |
| 2006/0021809 A1 | 2/2006 | Xu et al. | |
| 2006/0100833 A1 | 5/2006 | Plett | |
| 2007/0000129 A1 | 1/2007 | Hahn et al. | |
| 2007/0012177 A1 | 1/2007 | Miyamoto et al. | |
| 2007/0078521 A1 | 4/2007 | Overholser et al. | |
| 2007/0212519 A1 | 9/2007 | Nishimura et al. | |
| 2007/0217873 A1 | 9/2007 | Martin et al. | |
| 2008/0170921 A1 | 7/2008 | Sjoo | |
| 2008/0244891 A1 | 10/2008 | Iizumi et al. | |
| 2008/0245226 A1 | 10/2008 | Iizumi et al. | |
| 2008/0252412 A1 | 10/2008 | Larsson et al. | |

(56) References Cited

U.S. PATENT DOCUMENTS

| | | | |
|---|---|---|---|
| 2008/0260958 A1 | 10/2008 | Sekikawa et al. |
| 2009/0031564 A1 | 2/2009 | Meier |
| 2009/0058366 A1 | 3/2009 | Masuda |
| 2009/0136308 A1 | 5/2009 | Newitt et al. |
| 2009/0175571 A1 | 7/2009 | Boehm et al. |
| 2010/0000090 A1 | 1/2010 | Moss et al. |
| 2010/0031799 A1 | 2/2010 | Ast et al. |
| 2010/0101526 A1 | 4/2010 | Schaefer et al. |
| 2010/0105292 A1 | 4/2010 | Nagel et al. |
| 2010/0139607 A1 | 6/2010 | Herbst-Dederichs et al. |
| 2010/0316798 A1 | 12/2010 | Takahashi et al. |
| 2010/0323270 A1 | 12/2010 | Shibata et al. |
| 2011/0000085 A1 | 1/2011 | Kanai et al. |
| 2011/0023777 A1 | 2/2011 | Nishimura et al. |
| 2011/0030663 A1 | 2/2011 | Verpoort et al. |
| 2011/0297118 A1 | 12/2011 | Izawa et al. |
| 2012/0018407 A1 | 1/2012 | Schramm et al. |
| 2012/0321405 A1 | 12/2012 | Weisel |
| 2013/0039705 A1 | 2/2013 | Fang et al. |
| 2013/0047947 A1 | 2/2013 | Whitbeck et al. |
| 2013/0108384 A1 | 5/2013 | Yoshiba et al. |
| 2013/0199490 A1 | 8/2013 | Schramm et al. |
| 2013/0287506 A1 | 10/2013 | Morgulis et al. |
| 2013/0291823 A1 | 10/2013 | Morgulis |
| 2014/0248968 A1 | 9/2014 | Kojima et al. |
| 2014/0360355 A1 | 12/2014 | Whitbeck et al. |
| 2014/0364042 A1 | 12/2014 | Whitbeck et al. |
| 2015/0107076 A1 | 4/2015 | Maki et al. |
| 2015/0292432 A1 | 10/2015 | Stephenson et al. |
| 2016/0169149 A1 | 6/2016 | Hahn et al. |
| 2016/0319416 A1 | 11/2016 | Fioroni et al. |
| 2017/0120350 A1 | 5/2017 | Stephenson et al. |
| 2017/0120352 A1 | 5/2017 | Stephenson et al. |

FOREIGN PATENT DOCUMENTS

| | | | | |
|---|---|---|---|---|
| DE | 3918034 A1 | * | 12/1990 | ........... B23B 29/248 |
| DE | 4411296 A1 | | 7/1995 | |
| DE | 19508687 A1 | | 10/1995 | |
| DE | 4447514 A1 | | 2/1996 | |
| DE | 19919024 A1 | | 11/2000 | |
| DE | 10316919 A1 | | 10/2004 | |
| DE | 102004017714 A1 | | 6/2005 | |
| DE | 102004052211 A | | 4/2006 | |
| DE | 102006045275 B3 | | 2/2008 | |
| DE | 102006057641 A1 | | 6/2008 | |
| DE | 102007030876 A | | 1/2009 | |
| DE | 102008022225 A1 | | 11/2009 | |
| DE | 102008058452 A1 | | 2/2010 | |
| DE | 102010014689 A1 | | 10/2011 | |
| DE | 102010052735 A1 | | 11/2011 | |
| DE | 102010053327 A1 | | 6/2012 | |
| EP | 0716158 A1 | | 6/1996 | |
| EP | 0816527 A1 | | 1/1998 | |
| EP | 0903422 A1 | | 3/1999 | |
| EP | 1103341 A1 | | 5/2001 | |
| EP | 1408134 A1 | | 4/2004 | |
| EP | 1416063 A1 | | 5/2004 | |
| EP | 1504833 A1 | | 2/2005 | |
| EP | 1559807 A1 | | 8/2005 | |
| EP | 1854903 A1 | | 11/2007 | |
| EP | 1967601 A2 | | 9/2008 | |
| FR | 1354895 A | | 3/1964 | |
| GB | 304117 A | | 8/1929 | |
| GB | 631362 A | | 11/1949 | |
| GB | 1015036 A | | 12/1965 | |
| JP | 60-230975 A | | 11/1985 | |
| JP | 01246352 A | | 10/1989 | |
| JP | H06-65711 A | | 3/1994 | |
| JP | 08111582 A | | 4/1996 | |
| JP | 2001245457 A | | 9/2001 | |
| JP | 2001328018 A | * | 11/2001 | |
| JP | 3-155410 A | | 5/2003 | |
| JP | 2003311517 A | | 11/2003 | |
| JP | 2003319590 A | | 11/2003 | |
| JP | 2005336556 A | | 12/2005 | |
| JP | 2006083826 A | | 3/2006 | |
| JP | 2006097045 | | 4/2006 | |
| JP | 2006097046 | | 4/2006 | |
| JP | 2007239543 A | | 9/2007 | |
| JP | 2007277607 A | | 10/2007 | |
| JP | 2008-121073 A | | 5/2008 | |
| JP | 2010209454 A | | 9/2010 | |
| JP | 2010275898 A | | 12/2010 | |
| RU | 2297314 C2 | | 4/2007 | |
| SU | 1310181 A1 | | 5/1987 | |
| WO | 0037789 A1 | | 6/2000 | |
| WO | 2005040446 A1 | | 5/2005 | |
| WO | 2005073425 A1 | | 8/2005 | |
| WO | 2006040746 A2 | | 4/2006 | |
| WO | 2006/061710 A1 | | 6/2006 | |
| WO | 2007007821 A1 | | 1/2007 | |
| WO | 2007/087989 A1 | | 8/2007 | |
| WO | 2008034419 | | 3/2008 | |
| WO | 2010015229 A1 | | 2/2010 | |
| WO | 2011161346 A1 | | 12/2011 | |
| WO | WO 2013053191 A1 | * | 4/2013 | ........... B23C 5/1072 |

OTHER PUBLICATIONS

GB Search Report dated Mar. 3, 2017 for corresponding GB Application No. 1618208.1, 5 pages.
GB Search Report dated Mar. 15, 2017 for corresponding GB Application No. 1618212.3, 4 pages.
GB Search Report dated Mar. 16, 2017 for corresponding GB Application No. 1618213.1, 5 pages.
European Patent Office, European Search Report for the corresponding EP Application No. 10167055.2 dated Oct. 11, 2011, 7 pages.
International Patent Bureau, International Search Report dated Oct. 14, 2009 for the corresponding German patent Application No. DE 10 2008 019 933.8 filed Apr. 21, 2008 and the PCT/EP2009/054670 filed Apr. 20, 2009, 3 pages.
C. Verpoort, W. Blume, R. Ehrenpreis, Ford Motor Company, ICES-2006-1391, Proceedings of ICES2006, Therma Spraying of Aluminum Cylinder Bores by the Ford PTWA Spray Process, 2006 Internal Combustion Engine Division Spring Technical Conference May 7-10, 2006, Aachen, Germany, 6 pages.
Eberhard Kretzschmar, The Metal Spraying Process and its Application in our history, Veb Carl Marhold Publishing House, Halle (Salle), 1953, 11 pages.
Applicants' Statement of Relevance in Accordance With 37 C.F.R. 1.98(a)(3)(i) for IDS Reference JP 2001-245457, 1 page.
Japanese Patent Office, Japanese Office Action dated Jan. 28, 2014 for Japanese Patent Application No. 2010-139542, 2 pages.
European Patent Office, European Search Report for the corresponding European Patent Application No. 12192730.5-1353 dated Feb. 21, 2013, 5 pages.
Peter Ernst, Gerard Barbezat, Thermal Spray Applications in Powertrain Contribute to the Savings of Energy and Material Resources, Sulzer Metco AG Switzerland, Rigackerstrasse 16, 5610 Wohlen, Switzerland , 8 pages.
Journal of Thermal Spray Technology, JTTEE5 16: 181-182, In the News, Conference and Workshop Information, vol. 16(2) Jun. 2007, 1 page.
German Patent & Trademark Office, German Examination Report for the corresponding German Patent Application No. 10 2013 200 912.7 dated Aug. 28, 2013, 4 pages.
German Search Report dated Mar. 8, 2010 for 102009027200.3, 2 pages.
Non-final Office Action dated Dec. 12, 2013 for U.S. Appl. No. 13/538,151, filed Jun. 29, 2012, 13 pages.
Non-final Office Action dated Dec. 4, 2013 for U.S. Appl. No. 13/752,572, filed Jan. 29, 2013, 9 pages.
Chinese Office Action dated May 31, 2016 for corresponding CN Application No. 201310149575.5, 6 Pages.
Chinese Office Action dated Feb. 3, 2017 for corresponding CN Application No. 201310149575.5, 5 Pages.

(56) References Cited

OTHER PUBLICATIONS

Chinese Office Action dated Sep. 5, 2017 for corresponding CN Application No. 201410249667, 2 Pages.

* cited by examiner

MILLING TOOL WITH INSERT COMPENSATION

TECHNICAL FIELD

The present disclosure relates to a milling tool with insert compensation, for example, for use in milling engine bores.

BACKGROUND

Typically, the bores of gasoline and diesel engine blocks are machined to close dimensional and surface finish tolerances in order to maintain compression and provide adequate oil retention. In the conventional method, after removal of casting draft if necessary, bores are machined using a multi-step boring process to control dimension and finished with a honing process to control surface finish. Three separate steps are normally used in the boring process: rough, semi-finish, and finish boring. Each step generally requires a tool with a fixed diameter. In addition, finish boring tools typically require a post-process diameter gage and a tool adjustment head for compensation to maintain a consistent diameter as the tool wears. Each boring step requires about 10-15 seconds per bore cycle. The honing process following machining also typically has three steps. The first step, normally called the rough honing pass, may be directly affected by the incoming cylinder dimension and surface finish after finish boring. This conventional approach may produce high quality bores, but may be relatively inflexible and require substantial machine tool investment.

SUMMARY

In at least one embodiment, a milling tool is provided. The tool may include an elongated body having a longitudinal axis; and a plurality of cutting inserts, each having a cutting edge and a cutting radius, coupled to the body and spaced along the longitudinal axis; wherein one or more of the plurality of cutting inserts is mechanically adjustable between first and second cutting radii.

In one embodiment, a difference between the first and second cutting radii is at least 10 µm. The one or more mechanically adjustable cutting inserts may be secured to an attachment surface. The one or more mechanically adjustable cutting inserts may be configured to translate across the attachment surface. In one embodiment, the one or more mechanically adjustable cutting inserts may be attached to a cartridge and the cartridge may be attached to the elongated body. In another embodiment, all of the plurality of cutting inserts are mechanically adjustable between first and second cutting radii and a difference between the first and second cutting radii is at least 10 µm. The plurality of cutting inserts may span at least 100 mm along the longitudinal axis. The plurality of cutting inserts may be arranged in at least two rows and each of the cutting inserts may be mechanically adjustable between first and second cutting radii. In one embodiment, the one or more of the plurality of cutting inserts are mechanically and incrementally adjustable between a plurality of positions.

In at least one embodiment, a milling tool is provided. The milling tool may include an elongated body having a longitudinal axis; and a plurality of cutting inserts coupled to the body, spaced along the longitudinal axis, and including first and second translatable cutting inserts having first and second cutting radii, respectively; the first cutting radius differing from the second cutting radius by at least 10 µm.

In one embodiment, a difference between the first and second cutting radii is at most 50 µm. An average cutting radius of a top half of the plurality of cutting inserts may be less than an average cutting radius of a bottom half of the plurality of cutting inserts. An average cutting radius of a top third of the plurality of cutting inserts may be less than an average cutting radius of a bottom third of the plurality of cutting inserts. The plurality of cutting inserts may be configured to generate a non-uniform force distribution perpendicular to the longitudinal axis of the elongated body. In one embodiment, the plurality of cutting inserts includes at least four different cutting radii. The first cutting radius may differ from the second cutting radius by at least 15 µm.

In at least one embodiment, a milling tool is provided. The milling tool may include an elongated body having a longitudinal axis and first and second ends; and first, second, and third cutting inserts coupled to the body and spaced along the longitudinal axis in sequence from the first end to the second end, each cutting insert having a cutting radius; wherein the cutting radius of the second cutting insert is greater than the cutting radii of the first and third cutting inserts.

The cutting radius of the third cutting insert may be greater than the cutting radius of the first cutting insert. The tool may include at least six cutting inserts coupled to the body and spaced along the longitudinal axis. An average cutting radius of a top half of the plurality of cutting inserts may be less than an average cutting radius of a bottom half of the plurality of cutting inserts.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
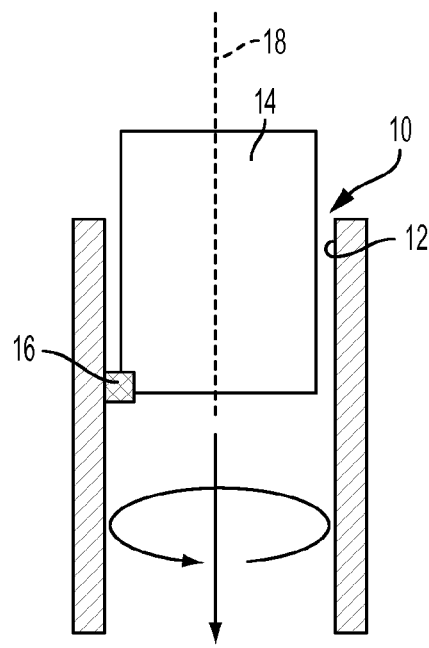
FIG. 1 is a schematic cross-section of a boring process for shaping an engine bore.

With reference to FIG. 1, a conventional boring process used to form an engine bore 10 is shown. The engine bore 10 may be formed in an engine block casting (e.g., a gray iron or compacted graphite iron engine block casting), in a cast iron liner inserted in an aluminum or magnesium engine block, or in a coated aluminum engine block (e.g., a thermally sprayed steel coating). The engine bore wall 12 may have an initial diameter, such as a cast iron liner diameter or it may be formed during a casting of an engine block, for example, using casting cores. However, the initial diameter may be machined (e.g., "cubed") in or otherwise formed prior to the boring process shown, for example, to remove casting draft. As described above, the conventional boring process includes three separate boring steps—rough, semi-finish, and finish boring. During each boring step, a boring bar 14 having one or more cutting inserts 16 attached thereto rotates about a longitudinal axis 18 of the boring bar to remove material from the engine bore wall 12. The cutting insert 16 has a fixed cutting radius from the longitudinal axis 18 that is larger than the radius of the engine bore wall 12 prior to the boring process. The longitudinal axis 18 of the boring bar is also the longitudinal axis of the engine bore 10. As a result of the boring process, the radius of the engine bore wall 12 becomes the same as the cutting radius of the cutting insert. Different boring bars 14 and/or cutting inserts 16 are used during the rough, semi-finish, and finish boring steps to increase the cutting radius during each step. The finish boring bar typically has a post process gage and feedback loop to a radial adjustment head on the boring bar to compensate for insert wear.

Accordingly, boring an engine bore is an inflexible process. Each boring step has a corresponding tool with a fixed cutting radius and the tool must be changed for each boring step to increase the cutting radius. Boring an engine bore requires multiple boring tools per engine bore geometry (e.g., three for the conventional three-step boring process). If multiple engine bore geometries are used across a group of engines, then the number of boring tools required can rapidly increase. The boring tools may therefore represent a significant capital investment, particularly as the number of different engine bore geometries increases. Moreover, the need to store and maintain all of the different boring tools can become resource intensive. In addition, the post process gage and adjustment head on the finish boring bar is costly and may duplicate similar gaging used prior to the first pass hone.

In addition to being inflexible and not cost effective, the boring process also has relatively long cycle times. As described above, each boring step takes approximately 10 to 15 seconds. Therefore, to complete the three boring steps (rough, semi-finish, finish) takes from 30 to 45 seconds per engine bore. Following boring, a rough honing process is performed, followed by at least one additional semi-finish or finish honing process. The rough honing process typically takes about 40 seconds, making the total boring and rough honing time for one engine bore substantially longer than a minute (e.g., 30 seconds of boring+40 seconds of rough honing=70 seconds total). Accordingly, while the conventional boring process can generate high quality engine bores, the process is generally costly, inflexible, and has long cycle times.

Figure 2:
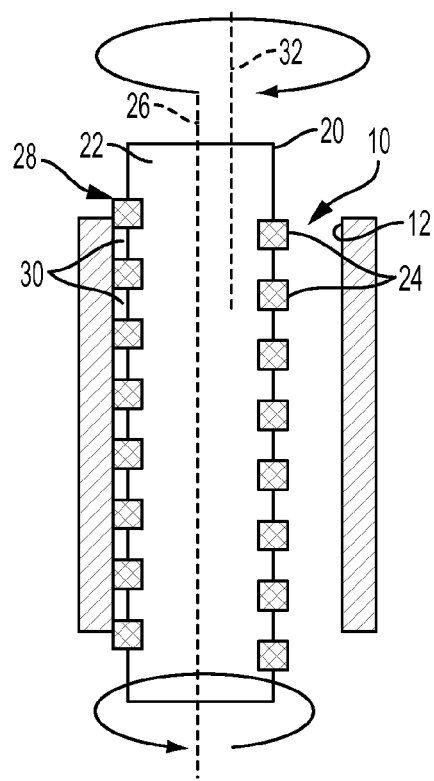
FIG. 2 is a schematic cross-section of an interpolated milling process for shaping an engine bore, according to an embodiment.

With reference to FIG. 2, it has been discovered that high quality engine bores may also be generated using an interpolated milling process. In interpolated milling, a milling tool 20 may be inserted into the engine bore 10 and used to remove material in a path around a perimeter of the engine bore 10. The engine bore 10 may be an engine bore liner, such as a cast iron liner, or it may be an aluminum bore having a coating thereon, such as a thermally sprayed steel coating (e.g., PTWA). The milling tool 20 may have a body 22 and a plurality of cutting inserts 24 coupled to the body 22, for example, either directly or via a cartridge. The cutting inserts 24 may extend along a length of the body 22 and be spaced apart along the length. The length of the body may correspond with a longitudinal axis 26 of the body 22. There may be two or more rows 28 of cutting inserts 24 extending along the longitudinal axis 26, for example, two, three, or four rows 28. The rows 28 may be arranged in a straight line or they may be staggered such that the inserts are arranged at different locations around the perimeter of the body 22.

In at least one embodiment, the body 22 and the cutting inserts 24 may extend or span an entire height of the engine bore 10. For example the body 22 and the cutting inserts 24 may extend or span at least 100 mm, such as at least 110 mm, 130 mm, 150 mm, or 170 mm. The rows 28 of cutting inserts 24 may include two or more inserts, such as at least 5, 8, 10, or more inserts. The number of total cutting inserts 24 may be the number of inserts per row multiplied by the number of rows 28. Therefore, if there are four rows and ten inserts per row, there may be 40 total cutting inserts 24. As shown in FIG. 2, two or more rows 28 may be offset from each other such that the inserts 24 in one row remove material that is not removed by another row due to the gaps 30 between the inserts 24. In one embodiment, the rows 28 may be configured in pairs, wherein the inserts 24 are offset to remove the material in the gaps 30 left by the other row 28. There may be one, two, or more sets of pairs, resulting in an even number of rows 28.

During the interpolated milling process, the body 22 may rotate about its longitudinal axis 26. Unlike boring, however, the longitudinal axis 26 of the body does not correspond or match the longitudinal axis 32 of the engine bore 10. The cutting radius of the milling tool 20 (e.g., from the tip of the cutting insert to the longitudinal axis of the body) is less than a radius of the engine bore 10. Accordingly, the milling tool body 22 may be inserted into the engine bore 10 (e.g., in a "z" direction) such that the body 22 and cutting inserts 24 extend or span the entire height of the engine bore 10. The body 22 may be rotated about its longitudinal axis 26 and then moved around the perimeter of the engine bore wall 12 to remove material therefrom. In one embodiment, the body 22 may be held constant or substantially constant in the z-direction during the interpolated milling process (e.g., the body 22 is not moved up and down relative to the engine bore 10). The body 22 may be moved in the x-y plane to move in a predetermined path and increase the size of the engine bore 10. The body 22 may be moved in a circular path having a radius or diameter that is larger than the current engine bore diameter to increase the radius/diameter of the engine bore.

Interpolated milling may be distinguished from interpolated mechanical roughening based on the tool type, tool motion, the resulting surface structure, and material application. Interpolated roughening typically includes a rotating tool configured to move around a perimeter of a bore to selectively remove material, thereby roughening the surface (e.g., forming grooves). However, interpolated roughening does not remove a uniform (or near-uniform) thickness of material to increase a diameter of a bore. In addition, interpolated roughening is only used on aluminum or magnesium engine blocks to prepare the surface for a subsequent coating (e.g., PTWA), not to form a controlled bore diameter in a cast iron liner or an already-coated aluminum engine bore.

Two or more revolutions or passes may be performed (e.g., complete circles). In one embodiment, the first revolution may remove the most material (e.g., increase the diameter of the engine bore the most). Successive revolutions may remove less material than the first, and may remove sequentially less material with each revolution. For example, the first revolution may increase the diameter of the engine bore 10 by up to 3 mm, such as 0.5 to 3 mm, 1 to 3 mm, 1 to 2.5 mm, 1.5 to 3 mm, or 2 to 3 mm. The second revolution may increase the engine bore 10 by up to 1.5 mm, such as 0.25 to 1.5 mm, 0.25 to 1 mm, 0.5 to 1.5 mm, 0.5 to 1.25 mm, or 0.75 to 1.25 mm, or about 1 mm (e.g., ±0.1 mm). Revolutions after the second revolution may increase the diameter of the engine bore 10 by up to 0.5 mm, for example, from 0.1 to 0.5 mm or 0.25 to 0.5 mm. The above diameter increases are merely examples, and the diameter may be increased by more or less during the different revolutions in some situations.

A revolution or pass of interpolated milling may be substantially faster than a boring step. As described above, a boring step generally takes from 10 to 15 seconds. In contrast, an interpolated milling pass of an engine bore may take 8 seconds or less, for example, 7, 6, or 5 seconds or less. In one embodiment, an interpolated milling pass may take from 2 to 5 seconds, 3 to 5 seconds, 4 seconds, or about 4 seconds (e.g., ±0.5 seconds). Accordingly, if there are 2 or 3 revolutions performed during an engine bore milling process, the total milling time may be less than 25 seconds, for example, less than 20 or less than 15 seconds. For milling processes with only two revolutions, the total milling time may be less than 10 seconds.

Figure 3:
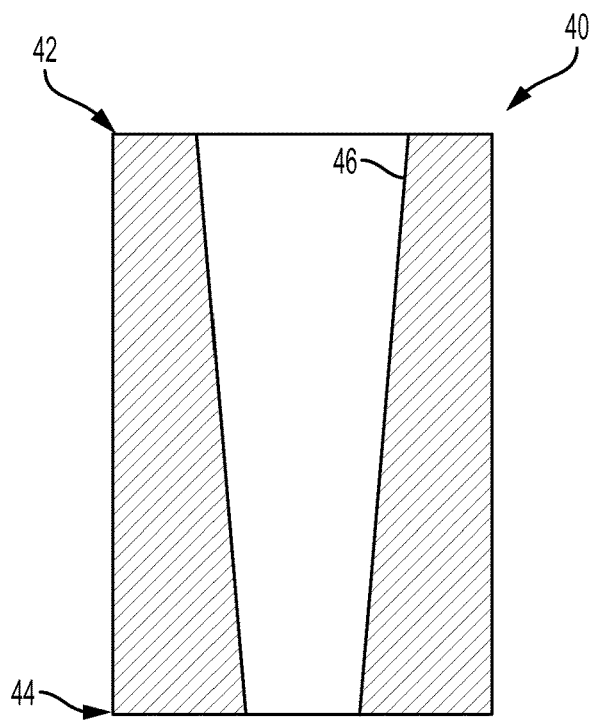
FIG. 3 is a schematic cross-section of a tapered engine bore formed by an interpolated milling process, according to an embodiment.

During the interpolated milling process, the reaction forces on the tool from the engine bore side wall may cause the tool to flex radially inward (e.g., towards the center or longitudinal axis of the engine bore). The flex may be greater for relatively long milling tools, such as the disclosed 100 mm or longer tools used to mill an entire height of the engine bore at one time. Accordingly, the interpolated milling revolutions may result in a slight taper in the engine bore side wall 12, with the diameter of the engine bore 10 generally decreasing from the top of the bore to the bottom. A schematic example of a tapered engine bore 40 is shown in FIG. 3. As shown, a first end 42, which is referred to as the top of the bore, has a larger diameter than a second end 44, which is referred to as the bottom of the bore. The diameter of the bore wall 46 is shown in FIG. 3 as continuously reducing at a constant rate, however, this is merely a simplified illustration. The diameter may locally increase in regions towards the bottom of the bore (e.g., the diameter may not continually decrease) and/or the rate of decrease in the diameter may not be constant (for example, it may be generally exponential). In one embodiment, the interpolated milling process may generate a frustoconical bore having a relatively large or wide diameter at the first end 42 and a relatively small or narrow diameter at the second end 44. Each additional interpolated milling pass may generate a new frustoconical bore, which may have larger wide and/or narrow diameters. As described above, the frustoconical bore(s) may have local variations in diameter along the longitudinal axis and the term is not meant to represent the exact geometric shape.

After the interpolated milling process (e.g., one or more revolutions), a honing process may be performed on the enlarged engine bore. The honing process may be performed to provide a more precise geometry and/or surface finish to the engine bore. Honing generally includes rotating a honing tool including two or more honing stones around a longitudinal axis while oscillating the honing tool in the z-direction (e.g., up and down) in the engine bore. The honing stones are typically formed of abrasive grains bound together by an adhesive. The abrasive grains may have a grit size, which may be referred to by a grit size number or a size of the grains (e.g., in microns). Force is applied to the honing stones in the radial direction to increase the diameter of the bore.

During the conventional engine bore boring process, there are typically three honing steps, similar to the boring steps—rough, semi-finish, and finish honing. These honing steps may remove sequentially less material (e.g., increase the diameter of the bore by smaller and smaller amounts). In addition, the boring process generally results in a substantially cylindrical bore. For example, the resulting bore may have a cylindricity of 25 μm or less, such as up to 20 μm. Therefore, conventional honing processes do not account for a tapered or frustoconical engine bore, such as that disclosed above from interpolated milling. In particular, the first, or rough, honing process is the honing step that is most affected by the incoming bore geometry.

Figure 4:
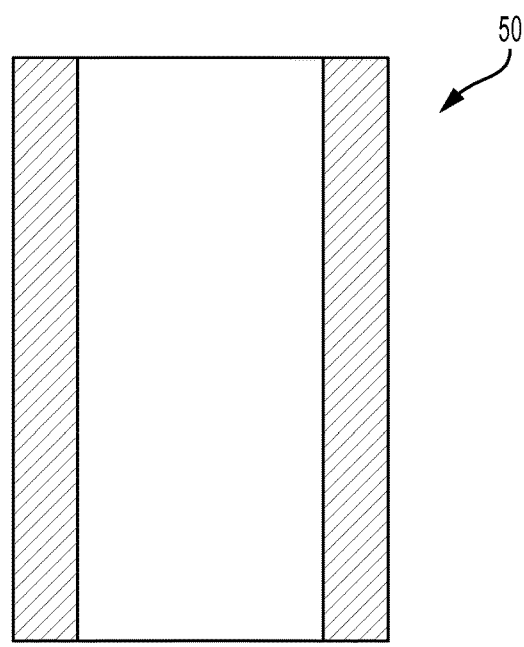
FIG. 4 is a schematic cross-section of a cylindrical engine bore after a rough honing process, according to an embodiment.

Accordingly, a modified honing process is disclosed that may reduce or eliminate a taper in an engine bore to produce a cylindrical or substantially cylindrical engine bore 50, such as shown in FIG. 4. The modified honing process may be a modified rough honing process, since the rough honing process is the first to encounter the post-milling engine bore. Conventional rough honing processes use an established grit size and honing force of about 180 μm and 100 kgf, respectively. These conventional honing parameters have been found to have difficulty in eliminating or reducing a taper in a engine bore. However, it has been discovered that by increasing the grit size and/or increasing the honing force, the rough honing process may be used to eliminate or reduced the taper in an engine bore.

In one embodiment, the grit size of the rough honing stone may be increased compared to the conventional rough honing stone (e.g., about 180 μm). For example, the grit size may be increased to at least 200 μm, 210 μm, 220, or 230 μm. These grit sizes may be an average grit size. In another embodiment, which may or may not be combined with increasing the grit size, the honing force during the rough honing process may be increased compared to the conventional rough honing force (e.g., about 100 kgf). For example, the rough honing force may be increased to at least 150 kgf, 200 kgf, 250 kgf, 300 kgf, or 350 kgf. In one embodiment, the rough honing force may be increased to 150 to 350 kgf, or any sub-range therein, such as 175 to 325 kgf, 200 to 325 kgf, 250 to 325 kgf, or about 300 kgf (e.g., ±10 kgf). Instead of absolute values, the rough honing force may also be increased relative to the standard rough honing force for a given honing process. For example, the rough honing force may be increased by at least 1.5×, 2×, 2.5×, 3×, or 3.5× compared to the conventional rough honing force. Therefore, if the conventional force was 75 kgf, then a 3× increase would be 225 kgf.

Instead of adjusting the rough honing parameters, one or two microsizing steps may be performed prior to a semi-finish honing step to eliminate or reduce the taper in the engine bore. In one embodiment, a microsizing step may be inserted between the final milling step and a semi-finish honing step. Microsizing uses abrasives particles (e.g., bonded diamond) on a fixed diameter (non-expanding) body to remove material. In contrast to honing, the tool is inserted into and withdrawn from the bore only once, rather than in multiple strokes with concurrent tool expansion. Microsizing may be performed using a single pass or multiple passes depending on the required stock removal.

Figure 5:
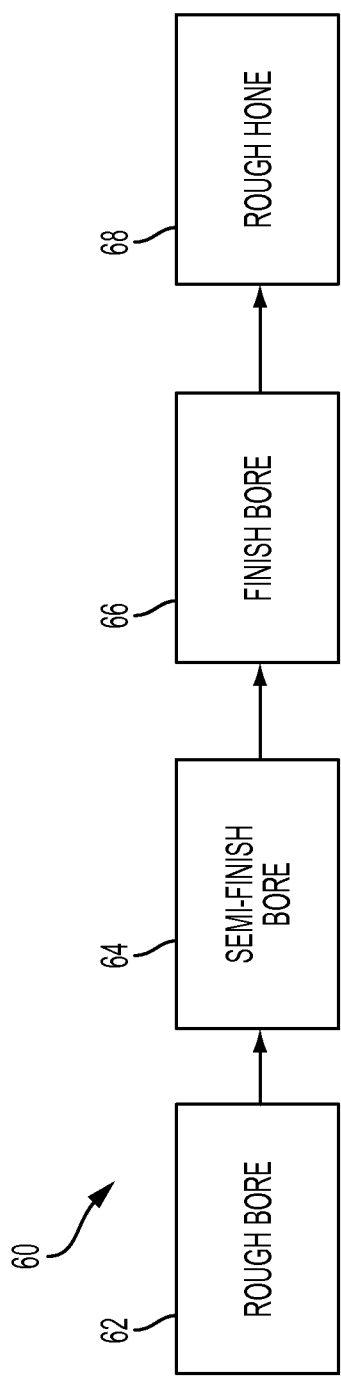
FIG. 5 is a flowchart of a conventional three-step boring process for shaping an engine bore.

With reference to FIG. 5, a flowchart 60 of a conventional boring process is shown. As described above, the conventional process includes three boring steps—rough bore 62, semi-finish bore 64, and finish bore 66. After boring, the engine bore is honed, typically in a three-step process similar to boring, starting with a rough honing step 68. The semi-finish bore 64 and finish bore 66 typically each take at least 10 seconds, and the rough bore typically takes longer, such as about 15 seconds. Accordingly, the boring process generally takes about 35 seconds or longer. The conventional rough honing step 68 takes about 40 seconds, resulting in a total time of about 75 seconds or longer for steps 62-68. The typical three-step honing process expands the diameter of the engine bore by about 90 μm, usually in steps of about 50 μm, 30 μm, and 10 μm for the first (rough), second, and third honing steps, respectively.

Figure 6:
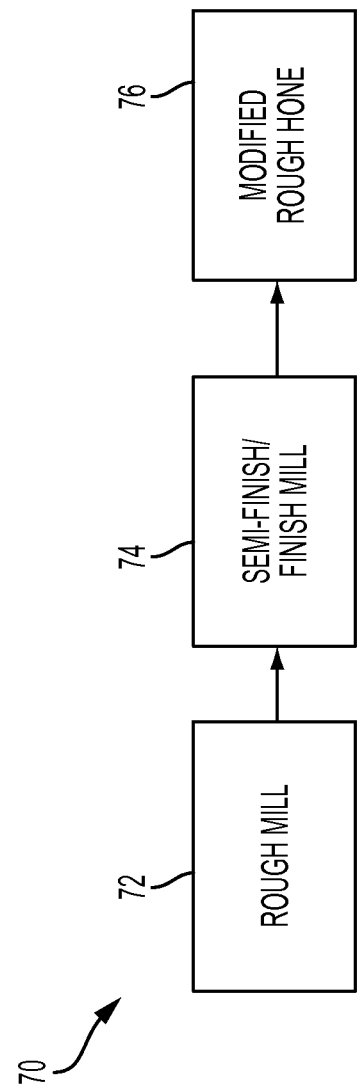
FIG. 6 is a flowchart of an interpolated milling process for shaping an engine bore, according to an embodiment.

With reference to FIG. 6, a flowchart 70 is shown for the interpolated milling process disclosed above. The interpolated milling process may eliminate boring from the engine bore generation process. Instead, the process may include a rough milling step 72 and a combined semi-finish/finish milling step 74, which may be referred to as a second milling step 74. Each interpolated milling step may include one or more revolutions around a perimeter of the engine bore to increase the diameter of the engine bore by removing material therefrom. In one embodiment, the rough milling step 72 may include only a single revolution or pass around the perimeter of the engine bore. The rough milling step may increase the diameter of the engine bore up to a few mm, for example, about 1 to 2 mm. In one embodiment, the second milling step 74 may include one or two revolutions or passes around the perimeter of the engine bore. Each pass during the second milling step 74 may remove less material and increase the diameter of the engine bore by a lesser amount than the rough milling step 72. For example, each pass may increase the diameter by up to 1 mm. In one embodiment, the milling steps 72 and 74 may be performed with the same tool or with identical tools (e.g., same cutting radius).

The milling steps 72 and 74 may be substantially shorter than the boring processes described above. In one embodiment, each milling revolution may take less than 8 seconds, for example, up to 7 seconds, 6 seconds, 5 seconds, or 4 seconds. Therefore, a milling process that includes one rough boring revolution and two semi-finish/finish revolutions may take less than 24 seconds and may be as short as 12 seconds or less. For a milling process with one rough boring revolution and one second milling revolution, the process may take less than 16 seconds and may be as short as 8 seconds or less. Accordingly, the total time for the pre-honing steps in the flowchart 70 (e.g., milling steps) may be significantly and substantially shorter than the total time for the pre-honing steps in the flowchart 60 (e.g., boring steps). As described above, the three-step boring process typically takes at least 35 seconds, which may be almost triple the time for a 3-revolution milling process (e.g., 12 seconds, 4 sec./rev) and more than quadruple the time for a 2-revolution milling process (e.g. 8 seconds, 4 sec./rev).

After the milling steps 72 and 74, a modified rough honing step 76 may be performed. As described above, the milling steps 72 and 74 may generate a tapered engine bore, which may be described as a frustoconical bore having narrow and wide end diameters. Accordingly, the modified rough honing step 76 may reduce or eliminate the taper in the bore, in addition to providing the more precise geometry and/or surface finish the occurs during typical rough honing. The modified rough honing step 76 may remove additional material from the narrower end of the engine bore (e.g., the bottom of the bore, as shown in FIGS. 3 and 4) to increase the diameter of the bore in the narrower end. As described above, this additional material removal may be accomplished by increasing the grit size of the honing stones and/or increasing the force/pressure applied by the honing stones.

The conventional rough honing step typically increases the diameter of the engine bore by about 50 μm, with the second and third passes increasing it by 30 μm and 10 μm, respectively, for a total of about 90 μm. In the modified rough honing step 76, the diameter of a narrow end of the engine bore may be increased by more than the conventional amount to reduce or eliminate the taper. Stated another way, the minimum diameter of the engine bore may be increased by more than the conventional amount to reduce or eliminate the taper. In at least one embodiment, the minimum diameter may be increased by at least 55 μm, for example, at least 60 μm, 65 μm, 70 μm, 75 μm, 80 μm, 85 μm, 90 μm, 95 μm, or 100 μm.

After the modified rough honing process 76, additional honing steps may be performed. These honing steps may be the same or similar to conventional second, third, or additional honing steps. As described above, the conventional multi-step honing process typically increases the diameter of the engine bore by about 90 μm. In one embodiment, the total diameter increase from the modified rough honing step 76 and the additional honing steps (e.g., one or two additional) may be significantly greater. For example, the total diameter increase may be at least 120 μm, 125 μm, 130 μm, 135 μm, 140 μm, 145 μm, or 150 μm. The total diameter increase may be from a minimum or narrow end of an incoming tapered bore or it may be from any other diameter of the incoming bore, including the wide end or maximum diameter.

The modified rough honing step 76 may take the same or a similar amount of time as the traditional rough honing step 68 (e.g., about 40 seconds). In at least one embodiment, a total time of steps 72-76 (e.g., milling and rough honing) may be 65 seconds or less. For example, the total time may be 60, 55, or 50 seconds or less. Accordingly, the method of generating engine bores using interpolated milling may be significantly shorter than the typical 75 second cycle time using the conventional boring process. In particular, the pre-honing portion of the process (e.g., boring or milling) may be cut more than in half. For example, a milling process with two milling revolutions may take only 8 seconds, compared to the 35 seconds for a three-step boring process.

Figure 7:
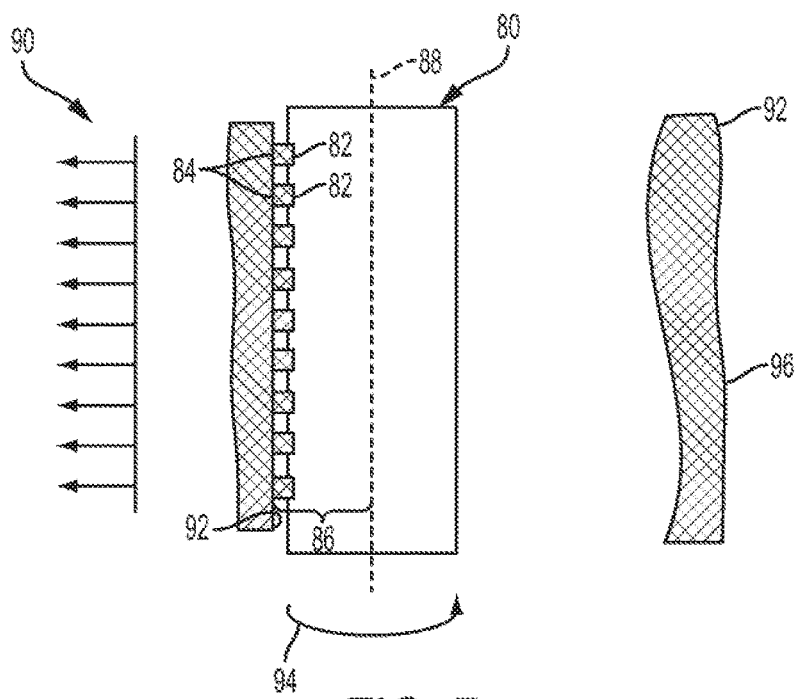
FIG. 7 is a schematic cross-section of a milling tool having a constant cutting radius and the force distribution and resulting engine bore wall, according to an embodiment.

With reference to FIG. 7, the milling tool 80 (e.g., a side cutting end mill) may have a plurality of cutting inserts 82 arranged along its length (e.g., parallel to its longitudinal axis), each having a cutting edge 84. In conventional milling tools, the cutting inserts 82 are configured such that each cutting edge 84 has the same cutting radius 86. The cutting radius 86 may be defined from a center or longitudinal axis 88 of the cutting tool 80 to the cutting edge 84.

The tool 80 in FIG. 7 is shown with the conventional setup of a uniform cutting radius 86 for each insert 82. The identical radii may therefore generate a uniform force distribution 90 on the engine bore wall 92. However, as described above, during the interpolated milling process, the reaction forces on the tool from the engine bore side wall may be generated. As a result, a bending moment 94 is generated, which causes the tool to flex radially inward (e.g., towards the center or longitudinal axis of the engine bore). In addition, there may be local variations in structural stiffness of the engine block, which may lead to tool bending or uneven part distortion and may result in dimensional errors in the engine bore. This may cause a taper 96 in the engine bore wall 92 during the interpolated milling process. When milling is used for other applications, deep pockets are finish machined in a series of shorter layers, cut sequentially until the full depth is reached. This approach significantly increases machining cycle time and tool wear rates but is necessary in many applications to meet required tolerances.

Figure 8:
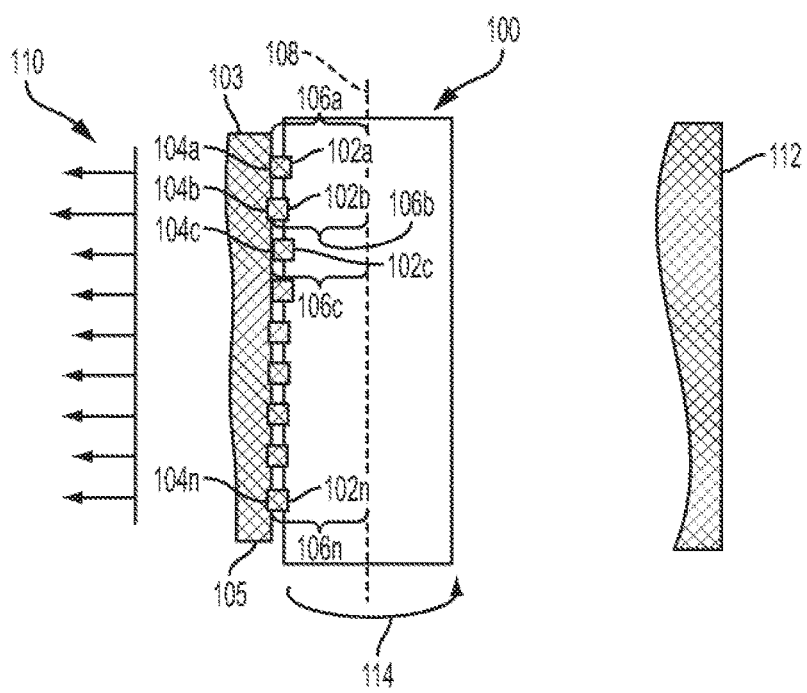
FIG. 8 is a schematic cross-section of a milling tool have adjustable cutting radii and the force distribution and resulting engine bore wall, according to an embodiment.

It has been discovered, however, that by adjusting the cutting radii of the individual cutting inserts, the taper may be reduced or eliminated. With reference to FIG. 8, a milling tool 100 is shown (e.g., a side cutting end mill) which may have a. plurality of cutting inserts 102a through 102n arranged along its length (e.g., parallel to its longitudinal axis) from first end 103 toward second end 105, each having a respective one of a plurality of cutting edges 104a through 104n. Unlike conventional milling tools, cutting inserts 102a, 102b and 102c, for example, are configured such that each respective cutting edge 104a, 104b and 104c does not have the same cutting radius 106a, 106b and 106c. The cutting radii 106a through 106n may be defined from a center or longitudinal axis 108 of the cutting tool 100 to the respective cutting edge 104a through 104n. The tool 100 may allow for a single-step full-depth milling process (e.g., cutting the entire height of the bore at once), without the need for multiple sequential cuts. As shown in FIG. 8, the cutting radius 106b of cutting insert 102b is greater than the cutting radii 106a and 106c of cutting inserts 102a and 102c. The cutting radius 106a of the first insert 102a is greater than the cutting radius 106c of cutting insert 102c.

As shown, there may be a plurality of different cutting radii 106, such that there are at least 2, 3, 4, 5, or more different cutting radii 106. In one embodiment, each cutting insert 102 may be independently adjustable from a first radius to a second radius or from a minimum radius to a maximum radius. The inserts 102 may be mechanically adjustable, such that the adjustment is effectuated by the tool (e.g., not directly by hand). However, the tool 100 may also include cutting inserts 102 that are not adjustable or multiple cutting inserts 102 may be linked such that their cutting radii adjust together. Any combination of independently adjustable, fixed, and linked cutting inserts may be included in the cutting tool 100. As shown in FIG. 8, the variable cutting radii may generate a non-uniform force distribution 110 on the engine bore wall 112.

The cutting radii 106 may be configured to reduce or eliminate the taper in the engine bore wall 112. For example, the cutting radii may be configured to correct for the flex in the tool 100 caused by a bending moment 114 caused by reaction forces from the engine bore wall 112 (described above). In one embodiment, the cutting radius 106 for one or more cutting inserts 102 may be determined based on an initial interpolated milling process with all cutting radii at the same or substantially the same distance. After the milling process, the engine bore may be measured to determine the dimensional variation at multiple axial positions in the bore. The dimensional variation may be an average variation at each position. The multiple axial positions may correspond to the positions of the cutting inserts, such as the center points of the inserts. The dimensional variations may be expressed as a "+" or "−" from the programmed or configured radius. For example, a radius that is 20 µm too large may be "+20" and a radius that is 20 µm too small may be "−20," or vice versa (sign can be either direction, as long as it's consistent). After the engine bore is measured and analyzed, the cutting radii 106 may be adjusted to have the same value, but opposite sign from the measured dimensions. Accordingly, if the radius for a certain insert position was +20, the cutting radius may be adjusted to be −20 (e.g., if the radius was 20 µm too large, the insert may be adjusted 20 µm radially inward). Any or all of the cutting inserts may be adjusted using the above methodology. Once a certain milling process has been measured and analyzed, the adjusted radii may be used in future milling processes without recalibrating. Alternatively, the adjustments may be recalibrated after a certain number of milling processes.

While the above process may provide an accurate method for adjusting the cutting radii 106, any suitable method may be used to adjust the cutting radii 106 to reduce or eliminate a taper in an engine bore. For example, the cutting radii adjustments may be computed or predicted using modeling. In one embodiment, the cutting radii adjustments may be computed using finite element analysis (FEA) or the finite element method (FEM). Finite element analysis as a general process is known in the art and will not be explained in detail. In general, it includes analyzing or approximating a real object by breaking it into a large number of "finite elements," such as small cubes. Mathematical equations may then be used to predict the behavior of each element based on inputs about the properties of the material. A computer or computer software may then add or sum up all the individual element behaviors to predict the behavior of the approximated object. For example, in the interpolated milling process, properties of the milling tool (e.g., number, size, material properties, configuration/arrangement, etc. of the cutting inserts), milling process (e.g., cutting radius, force applied, etc.), and the engine bore (e.g., material properties, configuration of bores, etc.) may be input into specially programmed software, which may then calculate expected or approximate+/−values similar to the method described above.

In another embodiment, the adjustments may be made based on simplified mathematical equations or assumptions. For example, the bending moment on the tool will generally cause the far end of the milling tool to flex inward the greatest amount, or at least greater than the near end of the tool. Accordingly, it may be assumed that the tool will flex inward in a generally increasing amount as the position along the length of the tool gets larger. The adjustments may therefore be made based on an increasing flex using a mathematical formula. For example, the formula may be a linear increase with length or an exponential increase, such as a hyperbolic increase. Therefore, the cutting radii adjustments may follow a formula predicting the general behavior of the tool during milling.

In at least one embodiment, the cutting radii 106 of the inserts may have a certain range of motion. The range of motion may be defined as a difference between the first (e.g., maximum) cutting radius and the second (e.g., minimum) cutting radius. In one embodiment, the difference between the first and second cutting radii may be at least 5 µm, such as at least 10 µm, 15 µm, 20 µm, 25 µm, or 30 µm. In another embodiment, the difference between the first and second cutting radii may be at most 50 µm, such as at most 45 µm or 40 µm. For example, the difference may be from 5 µm to 35 µm, or any sub-range therein, such as 5 to 25 µm, 10 to 30 µm, 10 to 25 µm, 15 to 30 µm, 15 to 25 µm, or other sub-ranges. Each cutting insert may have the same range of motion, or one or more inserts may have different ranges of motion. For example, inserts near the bottom of the tool may have a larger range of motion in order to adjust for the inward flex of the tool.

Figure 9:
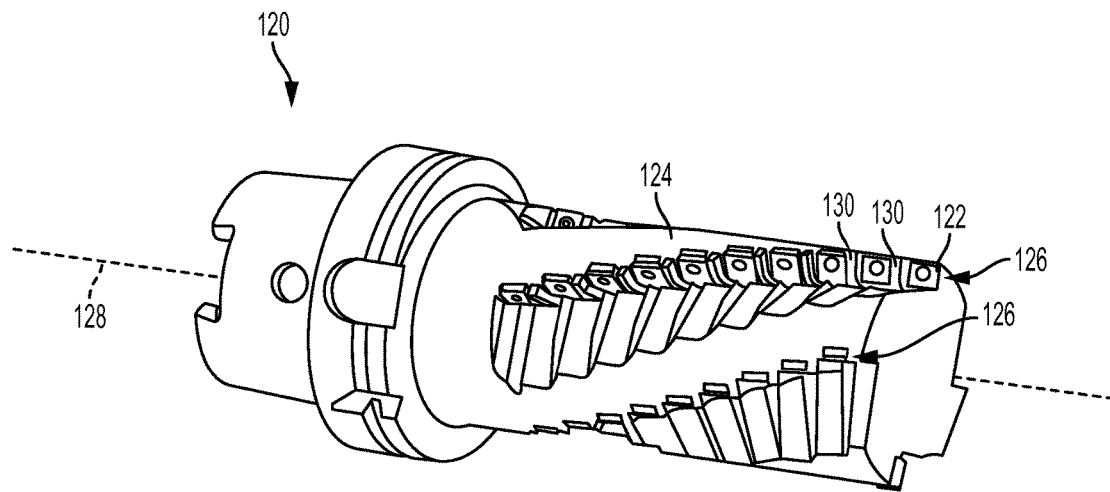
FIG. 9 is a perspective view of a milling tool having adjustable cutting inserts, according to an embodiment.
Figure 10:
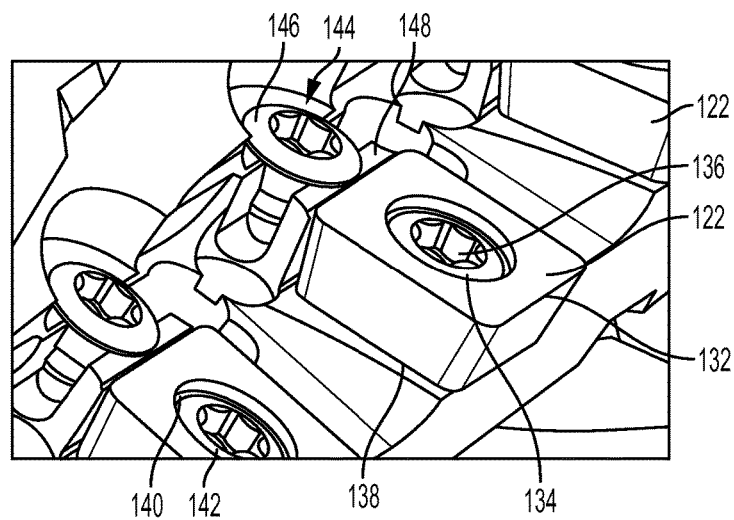
FIG. 10 is an enlarged view of the adjustable cutting inserts of FIG. 9, according to an embodiment.

With reference to FIGS. 9 and 10, an embodiment of a milling tool 120 is shown having adjustable cutting inserts 122. The inserts 122 may be any suitable type of cutting insert, such as tungsten carbide, cubic boron nitride, diamond, or others. The milling tool 120 shown is a side cutting end mill, however, the disclosed adjustable cutting inserts 122 may be applied to or used in other peripheral milling tools. The tool 120 includes a tool body 124, to which the cutting inserts 122 are coupled. The cutting inserts 122 may be directly attached to the body 124 or they may be indirectly attached, for example, through a cartridge that is attached to the body 124. As described above, there may be two or more rows 126 of cutting inserts 122 extending along the longitudinal axis 128 of the tool, for example, two, three, or four rows 126. The rows 126 may be arranged in a straight line or they may be staggered such that the inserts are arranged at different locations around the perimeter of the body 124 (e.g., as shown in FIG. 9). In one embodiment, the rows 126 may be configured in pairs and the inserts 122 in each pair may be configured such that the inserts at the same position in the rows 126 may have the same cutting radii 106. For example, the $5^{th}$ insert from the top in each row may have a "−15" position and the $6^{th}$ insert from the top in each row may have a "+10" position.

In at least one embodiment, the body 124 and the cutting inserts 122 may be configured to extend or span an entire height of an engine bore. For example, the body 124 and the cutting inserts 122 may extend or span at least 100 mm, such as at least 110 mm, 120 mm, 145 mm, or 160 mm. The rows 126 of cutting inserts 122 may each include two or more inserts, such as at least 5, 6, 7, 8, 9, 10, or more inserts. The number of total cutting inserts 122 may be the number of inserts per row multiplied by the number of rows 126. Therefore, if there are four rows and ten inserts per row, there may be 40 total cutting inserts 122. As shown in FIG. 9, two or more rows 126 may be offset from each other such that the inserts 122 in one row remove material that is not removed by another row due to the gaps 130 between the inserts 122. In one embodiment, the rows 126 may be configured in pairs, wherein the inserts 122 are offset to remove the material in the gaps 130 left by the other row 126. There may be one, two, or more sets of pairs, resulting in an even number of rows 126. For example, the tool shown in FIG. 9 includes four rows 126, each including ten cutting inserts 122. The rows are configured in two pairs, with the inserts in each pair being located on opposite sides of the tool body 124 (e.g., 180° around the perimeter).

With reference to FIG. 10, a close-up view of the cutting inserts 122 of the tool 120 is shown. The cutting inserts each have a cutting edge 132 that may form the reference point for measuring the cutting radius of the insert. Each insert 122 may be secured to the body 124. In the embodiment shown in FIGS. 9 and 10, the inserts 122 are each secured to the body 124 by a fastener 134, such as a screw. The fastener may extend through an opening or hole 136 in the insert 122 and into a threaded portion (not shown) of an attachment surface 138 on the body 124. The opening 136 may be a clearance hole having a diameter that is larger than the diameter of the fastener 134, thereby allowing the insert 122 to move radially inward and outward prior to final tightening of the fastener 134. The insert may have a lip 140 surrounding the opening 136 that is configured to contact the head 142 of the fastener and secure the insert 122 in place.

An adjusting mechanism 144 may be positioned adjacent to any or all of the cutting inserts 122 for adjusting the cutting radius of the cutting edge 132. In one embodiment, the adjusting mechanism 144 may include an adjustment screw 146 and an adjustment member 148. The adjustment screw 146 may be tapered such that it has a larger diameter at its top and a smaller diameter at its bottom. The adjustment screw 146 may be received by a threaded portion in the body 124. The adjustment member 148 may be disposed adjacent to the cutting insert 122 and configured to be contacted by the adjustment screw 146. The adjustment member 148 may be formed as a wall that is adjacent to the cutting insert 122 and may contact a side of the cutting insert 122.

In operation, the cutting radius of the cutting insert 122 may be adjusted by the movement of the adjustment member 148 (e.g., wall) via rotation of the adjustment screw 146. Prior to securing the cutting insert 122 to the attachment surface 138 via the fastener 134, the adjustment screw 146 may be rotated such that it is threaded deeper into the threaded portion of the body 124 or that it is unthreaded or unscrewed from the threaded portion. When the adjustment screw 146 is threaded deeper, the tapered diameter of the screw contacts and pushes the adjustment member 148 such that it flexes radially outward to increase the cutting radius of the insert. When the adjustment screw 146 is unscrewed or loosened, the tapered diameter of the screw ceases to apply force to the adjustment member 148 or applies less force and the adjustment member 148 may partially or fully return to its unflexed position and allow the cutting radius to be reduced. Accordingly, by adjusting the adjustment screw 146, the cutting insert 122 may be translated across the attachment surface 138 to adjustably increase or decrease the cutting radius of the cutting insert 122. The adjustment may be controllable and repeatable. For example, the cutting radius may be incrementally controlled based on the number of rotations of the adjustment screw 146 (e.g., inward or outward).

While FIGS. 9 and 10 show an example of an adjustment mechanism, any suitable adjustment mechanism for controllably and reliably changing the cutting radius of a cutting insert may be used. For example, instead of translating along the attachment surface 138, the cutting inserts may rotate about an axis parallel to the longitudinal axis of the tool to increase or decrease the cutting radius. In addition, while the cutting inserts 122 are shown as secured directly to the body 124, they may also be coupled indirectly to the body 124, for example, using a cartridge. The inserts may be attached to a cartridge in a similar manner as disclosed above (e.g., with an adjustable cutting radius relative to the cartridge) and then the cartridge may be secured to the body 124.

Accordingly, a milling tool having adjustable cutting inserts is disclosed in which the cutting radius of one or more of the cutting inserts may be changed or adjusted. The tool may be used to reduce or eliminate a taper in an engine bore during an interpolated milling process. As described above, a bending moment on the tool may cause it to flex inward and have inconsistent material removal along a longitudinal axis of the tool. The inserts may therefore be adjusted, for example, based on empirical testing or modeling, to compensate for the dimensional errors that are generated with a single, constant cutting radius for an entire tool.

It has also surprisingly been found that the dimensional errors may not result in a constantly decreasing bore diameter (e.g., a continuous taper). Instead, there may be local areas where the diameter from milling is larger than an area more towards the top of the bore. Accordingly, a milling tool for correcting dimensional errors may include at least three cutting inserts in sequence from a first, top end of the tool body to a second, bottom end of the tool body in which the cutting radius of the second insert is greater than the cutting radii of the first and third inserts. This may correct for dimensional errors in which there is a local region having a larger diameter than a region above it in the engine bore. The cutting radius of the first insert may be larger than the cutting radius of the third insert. There may, of course, be more than three cutting inserts coupled to the tool, and the disclosed three-insert sequence may occur anywhere in the sequence of inserts from the top to the bottom of the tool.

However, there may be a general trend of the bore diameter decreasing from a top of the bore to the bottom (e.g., in the direction of insertion of the tool). Accordingly, the cutting radius of the tool may be adjusted such that it generally increases from the top to the bottom. In one embodiment, the cutting inserts in the top half of the tool may be adjusted to have an average cutting radius that is smaller than an average cutting radius of the cutting inserts in the bottom half of the tool. For example, if there are ten cutting inserts spaced along the longitudinal axis, an average cutting radius of the top five inserts may be less than an average of the bottom five inserts. In another embodiment, an average cutting radius of the top third of the cutting inserts may be adjusted to be less than an average cutting radius of the bottom third of the cutting inserts. The middle third of the cutting inserts may be adjusted to have an average cutting radius that lies between the top third and the bottom third. For example, if there are nine cutting inserts spaced along the longitudinal axis, an average cutting radius of the top three inserts may be less than an average of the bottom three inserts. In one example, an average cutting radius of the middle three inserts may be less than an average of the bottom three inserts but greater than an average of the top three inserts. If the number of cutting inserts is not a multiple of two or three, then the top/bottom half or third may be defined by rounding down or up. For example, if there are ten inserts, the top and bottom third may include three inserts each.

Figure 11:
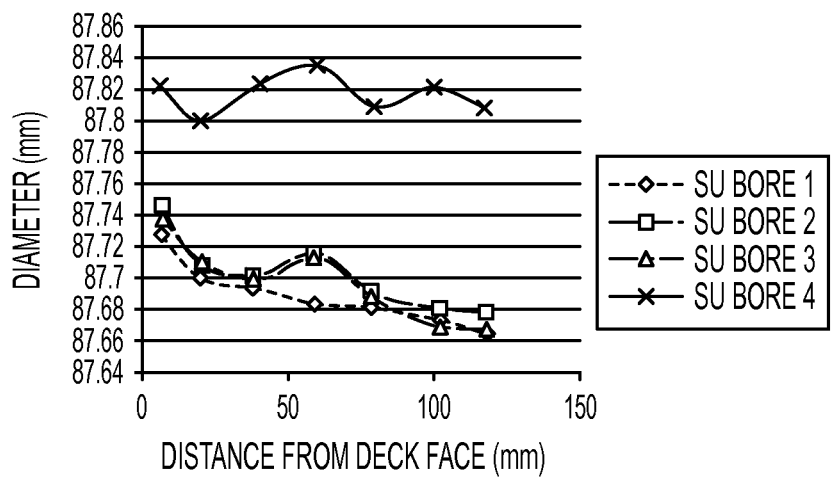
FIG. 11 is a plot showing the diameter of several bores as a function of depth, including a bore formed using a milling tool having adjustable cutting inserts.
Figure 12:
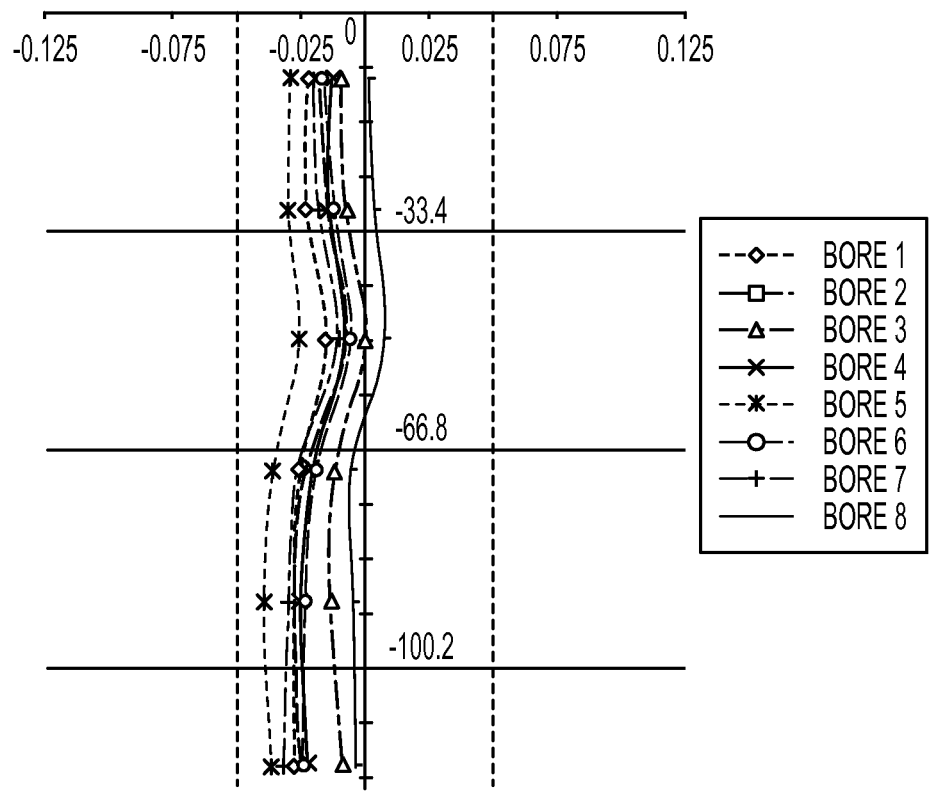
FIG. 12 is a plot showing the bore diameter of multiple bores cut using a milling tool having adjustable inserts.

With reference to FIGS. 11 and 12, experimental data demonstrating improved dimensional control of engine bore diameters using adjustable cutting inserts is shown. Regarding FIG. 11, four initial bores were milled using a tool with a constant cutting radius. The diameter of the bores 1-3 as a function of the bore depth from the deck face are shown in FIG. 11. Bore 4 was recut using a milling tool having adjusted inserts according to the method described above using equal offsets with opposite signs. In order to measure the difference, the interpolated milling diameter was increased during the bore 4 recut. As shown in FIG. 11, bores 1-3 showed a general decrease in bore diameter as the bore depth increased (except some local increases, as described above). Bores 1-3 showed a roughly 60 μm difference in diameter from top to bottom, a significant taper. In contrast, bore 4 stayed within a 40 μm window and did not show a general trend of narrowing from top to bottom.

FIG. 12 shows bore diameter data for 8 bores of a V8 engine milled using a milling tool having adjusted inserts according to the method described above using equal offsets with opposite signs. As shown, all 8 bores diameters were controlled to within a 20 μm window from top to bottom. In general, the conventional three-step boring process described above also typically controls the diameter to within 20 μm. Therefore, the disclosed adjustable milling tool may allow the interpolated milling process to approach or achieve a similar or better level of control over the engine bore diameter, while also providing the other improvements disclosed above (e.g., shorter cycle times, reduced tooling investment, increased flexibility). For example, the disclosed methods and tools may control the bore diameter to within a 25 μm window or less, such as up to 20 μm, up to 15 μm, or up to 10 μm.

In addition to tapering, another potential challenge for using milling (e.g., interpolated milling) to generate engine bores may be the resulting surface roughness of the bore wall. The honing process that follows the milling process may be more effective with a relatively rough surface. The conventional three-step boring process to generate the engine bore results in a relatively rough surface that allows for effective honing thereafter. However, milling typically results in a smoother surface than boring, due to the insert alignment and the relatively long, smooth cutting edges on each insert. Milling inserts generally include a cutter body fitted with detachable inserts of a tool material, such as tungsten carbide, cubic boron nitride, or diamond. The tools are normally mounted with one face parallel to the tool axis. Compared to boring and similar internal machining processes, milling produces a relatively smooth surface finish, with the average roughness typically around 1 micron Ra. It has been found that this low roughness may make side-cutting milling difficult or unsuitable for some applications which require a minimum roughness for subsequent processing, such as honing. Honing typically requires a minimum roughness so that the abrasive stones will cut without applying excessive stone pressure and/or so that there is material for the honing stones to "bite" into.

Figure 13:
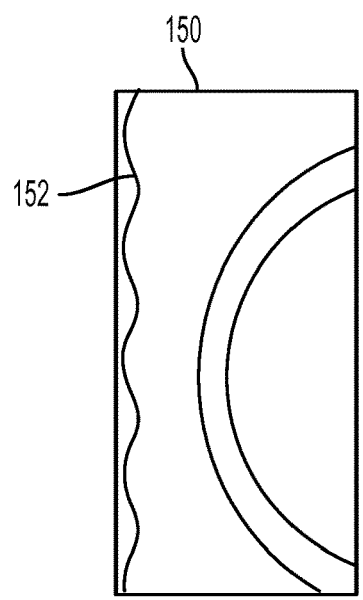
FIG. 13 is a plan view of a textured cutting edge of a milling cutting insert, according to an embodiment.

With reference to FIG. 13, a cutting insert 150 is shown that may be used in the disclosed milling processes. The cutting insert 150 may have a cutting edge 152. In contrast to conventional milling tool cutting edges, which are smooth and flat, the cutting edge 152 may be relatively rough or textured. For example, a conventional milling cutting edge generally has a mean roughness (Rz) of less than 6 μm. Mean roughness may be calculated by measuring the vertical distance from the highest peak to the lowest valley within a certain number of sampling lengths, for example, five sampling lengths. The Rz value is then determined by averaging these distances. Mean roughness averages only a certain number (e.g., five) of the highest peaks and the deepest valleys, which may result in the extremes having a greater influence on the Rz value (e.g., compared to average roughness, Ra). Rz may be defined according to ASME standard B46-1.

The cutting edge 152 of cutting insert 150 may have a greater roughness (e.g., mean roughness) than conventional milling insert cutting edges. In one embodiment, the cutting edge 152 may have a mean roughness (Rz) of at least 5 μm, for example, at least 7.5 μm, 10 μm, 12 μm, or 15 μm. In another embodiment, the cutting edge 152 may have a mean roughness (Rz) of 7 to 30 μm, or any sub-range therein, such as 7 to 25 μm, 10 to 25 μm, 12 to 25 μm, 10 to 20 μm, or 12 to 20 μm.

The surface roughness of the cutting edge 152 may generate a similar, corresponding surface roughness in the object being milled (e.g., an engine bore). Accordingly, a cutting insert 150 having a cutting edge 152 with a mean roughness (Rz) of 12 to 20 μm may generate an engine bore wall having a mean roughness (Rz) of 12 to 20 μm. In one embodiment, the cutting insert 150 with the relatively rough cutting edge 152 may be used during the interpolated milling processes described above to generate a relatively rough milled engine bore prior to honing. The relatively rough cutting edge 152 may be used only in a final milling pass or revolution in order to generate the rougher surface for honing. However, the cutting edge 152 may also be used for any or all of the milling passes prior to the final pass.

Figure 14A:
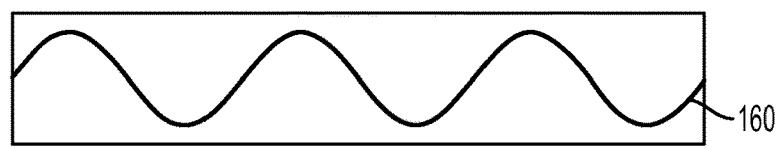
FIG. 14A is an example of a sinusoidal profile for a textured cutting edge, according to an embodiment.
Figure 14B:
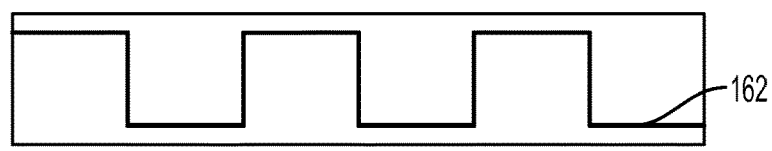
FIG. 14B is an example of a square-wave profile for a textured cutting edge, according to an embodiment.
Figure 14C:
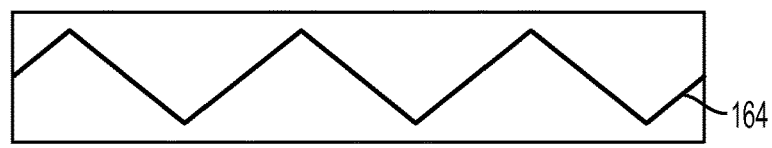
FIG. 14C is an example of a triangle-wave profile for a textured cutting edge, according to an embodiment.
Figure 14D:
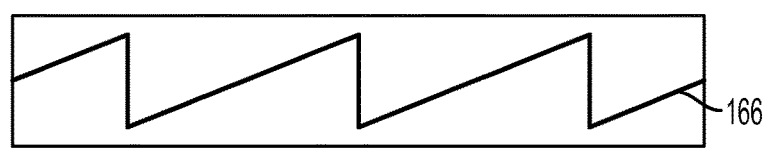
FIG. 14D is an example of a sawtooth-wave profile for a textured cutting edge, according to an embodiment.

The textured cutting edge 152 is shown in FIG. 13 to have a generally sinusoidal shape or profile, however, any suitable profile may be used that results in the disclosed surface roughness. With reference to FIGS. 14A-14D, several examples of shapes or profiles of a textured cutting edge are shown. FIG. 14A shows a sinusoidal profile 160, FIG. 14B shows a square-wave profile 162, FIG. 14C shows a triangle-wave profile 164, and FIG. 14D shows a sawtooth-wave profile 166. The cutting edge of a cutting insert may be generated with one or more of these profiles, and different cutting inserts may have cutting edges with differing profiles. While the profiles 160-166 are shown in schematic, idealized form, the profile shapes may be less precise and more general.

In one embodiment, the profile of cutting edges that are configured to contact the same region (e.g., at a certain height or range of heights in an engine bore) may have staggered or offset peaks and valleys. Peaks may refer to a projection above the mean in surface roughness and valleys may refer to a depression below the mean in surface roughness. Accordingly, by staggering the peaks and valleys of the cutting edge profiles, less extreme surface variations may be formed in the resulting surface. For example, if the cutting inserts are arranged in rows having the same number of inserts in each row, then at least two inserts located at the same height or position in the row (e.g., 3$^{rd}$ insert from the top) may have offset or staggered peaks and valleys.

The cutting inserts having relatively rough cutting edges may be generated using any suitable method. The cutting edges may be originally formed having the increased surface roughness or surface profile, or the increased roughness or profile may be provided in a later step. If provided in a later step, the increased roughness may be generated using any suitable process. In one embodiment, the increased roughness may be generated by electrical discharge machining (EDM), which may also be referred to as spark erosion or other names. EDM generally involves a series of rapidly recurring current discharges between a tool electrode and a workpiece electrode, separated by a dielectric liquid and subject to an electric voltage. When the electrodes are brought close together, the electric field between the electrodes becomes greater than the strength of the dielectric, it breaks and allows current to flow and material is removed from both electrodes. To generate a certain profile or geometry, the EDM tool may be guided along a desired path very close to the workpiece (e.g., cutting edge).

Other "non-mechanical" methods may also be used to generate the surface roughness and/or profiles, such as electrochemical machining (ECM), water jet cutting, or laser cutting. Mechanical methods may also be used, however, such as grinding with an abrasive wheel or polishing with an abrasive brush. The cutting edge may be ground or polished with a grit size that corresponds to the desired roughness of the cutting edge, such as at least 5 μm, 7.5 μm, 10 μm, 12 μm, or 15 μm. In one embodiment, the cutting edge may be flank polished/ground with a diamond grinding wheel having a grit size of at least 5 μm, 7.5 μm, 10 μm, 12 μm, or 15 μm.

Figure 15:
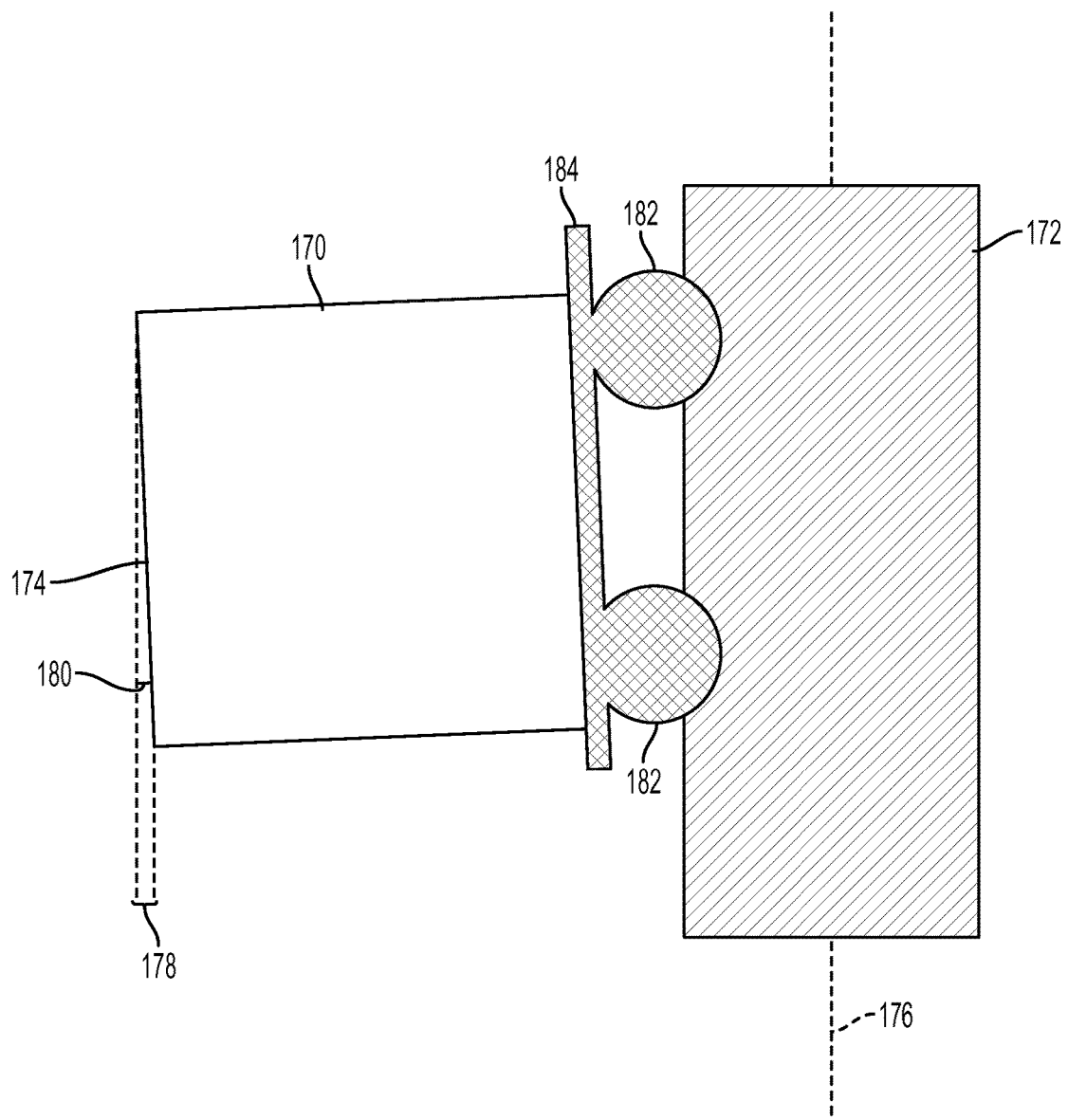
FIG. 15 is a schematic side view of a milling tool having adjustable angled cutting inserts, according to an embodiment.

In addition to, or instead of, roughening or texturing the cutting edges of the cutting inserts to generate a rougher engine bore wall, the insert may be angled or inclined to provide the same or a similar result (e.g., greater roughness). With reference to FIG. 15, an angled milling cutting insert 170 is shown coupled to a cutter body 172. The angled insert 170 may have a cutting edge 174 with an orientation that is oblique to a longitudinal axis 176 of the cutter body 172 (e.g., not parallel or perpendicular). One or more of the cutting inserts coupled to the cutter body 172 may have an angled cutting insert, for example, all the cutting inserts. Accordingly, when the cutter body rotates around the longitudinal axis 176, the cutting edges 174 may remove varying amounts of material along a height of the cutting edges, resulting in greater surface roughness.

In one embodiment, the angle or incline of the cutting edge 174 may be expressed as a step height 178, defined as a difference in cutting radius from one end of the cutting edge to the other (e.g., as shown in FIG. 15). The step height may be configured to form a mean surface roughness (Rz) as described above for the textured inserts (e.g., at least 5 μm, 10 μm, etc.). In one embodiment, the step height may be at least 5 μm, 7.5 μm, 10 μm, 15 μm, 20 μm, 25 μm, or 30 μm. For example, the step height may be 5 to 30 μm, or any sub-range therein, such as 7 to 25 μm, 7 to 20 μm, 7 to 15 μm, 10 to 20 μm, or 12 to 20 μm. While the angled insert 170 is shown having a top cutting radius that is larger than a bottom cutting radius, the configuration may also be opposite. In one embodiment, each cutting insert (or each cutting insert with a step height) may have the same step height. However, in some embodiments there may be inserts having a plurality of different step heights.

In another embodiment, the angle or incline of the cutting edge 174 may be expressed as an offset angle 180, defined as an angle of offset from the longitudinal axis 176 of the cutter body (e.g., from vertical). As shown in FIG. 15, the offset angle may be exaggerated for ease of viewing. Similar to the step height, the offset angle 180 may be configured to form a mean surface roughness (Rz) as described above for the textured inserts (e.g., at least 5 μm, 10 μm, etc.). In one embodiment, the offset angle 180 may be from 0.01 to 0.5 degrees, or any sub-range therein. For example, the offset angle 180 may be 0.01 to 0.3 degrees, 0.01 to 0.2 degrees, 0.03 to 0.2 degrees, or 0.05 to 0.1 degrees. In one embodiment, each cutting insert (or each cutting insert with an offset) may have the same offset angle. However, in some embodiments there may be inserts having a plurality of different offset angles.

Any suitable mechanism may be used to offset or create the step height in the cutting edge 174. In the embodiment shown in FIG. 15, a mechanism is shown that is similar to that shown and described with respect to FIGS. 9 and 10. However, the mechanism in FIG. 15 may have two adjustment screws 182, instead of one. The adjustment screws 182 may be spaced apart and may both be tapered such that they have a larger diameter at the top and a smaller diameter at the bottom. The adjustment screws 182 may be received by a threaded portion in the body 172 and be adjacent to an adjustment member 184. The adjustment member 184 may be disposed adjacent to the cutting insert 170 and configured to be contacted by the adjustment screws 182. The adjustment member 184 may be formed as a wall that is adjacent to the cutting insert 170 and may contact a side of the cutting insert 170.

Similar to the single-screw configuration, described above, the offset of the cutting insert 170 may be mechanically adjusted by the movement of the adjustment member 184 (e.g., wall) via rotation of the adjustment screws 182. Prior to securing the cutting insert 170 to an attachment surface of the cutter body 172 via a fastener, the adjustment screws 182 may be rotated such that they are threaded deeper into a threaded portion of the body 172 or that they are unthreaded or unscrewed from the threaded portion. When each adjustment screw 182 is threaded deeper, the tapered diameter of the screw contacts and pushes the adjustment member 184 such that it flexes radially outward. When the adjustment screw 182 is unscrewed or loosened, the tapered diameter of the screw ceases to apply force to the adjustment member 184 or applies less force and the adjustment member 184 may relax or partially or fully return to its unflexed position.

Accordingly, by adjusting each of the adjustment screws 182 to different depths or to flex the adjustment member 184 by different amounts along its length, the cutting insert 170 may be translated across the attachment surface to adjust an angle or offset of the cutting insert 170. The adjustment may be controllable and repeatable. For example, the angle/offset may be incrementally controlled based on the number of rotations of each adjustment screw 182 (e.g., inward or outward). While FIG. 15 shows an example of an angle/offset adjustment mechanism, any suitable adjustment mechanism for controllably and reliably changing the angle/offset of a cutting insert may be used.

The disclosed milling methods for forming engine bores may reduce cycle times (e.g., compared to boring), increase flexibility, reduce tooling costs, and reduce tooling and machining equipment, among other benefits. Engine bores may be milled in a fraction of the time that boring currently takes, for example, less than 15 seconds for a three-pass milling process or less than 10 seconds for a two-pass milling process. This may reduce cycle times and allow higher throughput with less equipment or similar throughput with less equipment. The same milling tool may be used for each milling pass while generating a bore and for multiple different bore geometries. The milling process is therefore much more flexible than boring, which requires a separate tool for each precise bore diameter. This increased flexibility may allow for significant reductions in tooling costs across multiple engine block designs by drastically reducing the number of tools needed. Greater flexibility and less tools may therefore allow fewer machining centers to produce the same number of engine block configurations. Milling combined with a modified rough honing process may also eliminate the close-looped post process gaging and diameter adjusting head required for finish boring. In addition, milling can be performed dry, while boring requires high-volume, controlled temperature coolant application.

The disclosed adjustable insert milling tools and/or the angled or inclined cutting inserts may be used in the disclosed milling processes, although they are not required. The adjustable inserts may allow for a reduction or elimination in the taper that may occur during the milling process. This may facilitate the rough honing step in the milling process by reducing the honing force and/or stone grit size necessary to eliminate the taper and generate a cylindrical bore. The angled cutting inserts may also make the rough honing step easier by increasing the surface roughness of the engine bore during the final milling pass. This may allow the honing force to be reduced during rough honing. The milling processes and tools disclosed herein may be used in forming an engine bore, however, they may also be applicable to forming any generally cylindrical opening for any application.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A milling tool comprising:
   an elongated body having a longitudinal axis and first and second ends; and
   a plurality of cutting inserts including first, second and third cutting inserts coupled to the body and helically staggered along the longitudinal axis in sequence from the first end towards the second end and having first, second and third cutting radii, respectively, the second cutting insert disposed between the first and third cutting inserts,
   one or more of the plurality of cutting inserts are mechanically adjustable, the second cutting radius is greater than the first and third cutting radii, and the first cutting radius is greater than the third cutting radius.

2. The tool of claim 1, wherein a difference between the first and second cutting radii is at least 10 µm.

3. The tool of claim 1, wherein the one or more mechanically adjustable cutting inserts are secured to an attachment surface.

4. The tool of claim 3, wherein the one or more mechanically adjustable cutting inserts are configured to translate across the attachment surface.

5. The tool of claim 1, wherein the one or more mechanically adjustable cutting inserts are attached to a cartridge and the cartridge is attached to the elongated body.

6. The tool of claim 1, wherein all of the plurality of cutting inserts are mechanically adjustable between first and second cutting radii and a difference between the first and second cutting radii is at least 10 µm.

7. The tool of claim 1, wherein the plurality of cutting inserts span at least 100 mm along the longitudinal axis.

8. The tool of claim 1, wherein the plurality of cutting inserts are arranged in at least two rows and each of the cutting inserts is mechanically adjustable between first and second cutting radii.

9. The tool of claim 1, wherein the one or more of the plurality of cutting inserts are mechanically and incrementally adjustable between a plurality of positions.

10. A milling tool comprising:
    an elongated body having a longitudinal axis and first and second ends; and
    a plurality of cutting inserts including first, second and third translatable cutting inserts coupled to the body, helically staggered along the longitudinal axis in sequence from the first end towards the second end, and having first, second and third cutting radii, respectively, the second cutting insert disposed between the first and third cutting inserts, the second cutting radius is greater than the first and third cutting radii, the first cutting radius is greater than the third cutting radius, the first and second cutting radii differing by at least 10 µm.

11. The tool of claim 10, wherein a difference between the first and second cutting radii is at most 50 µm.

12. The tool of claim 10, wherein the plurality of cutting inserts are configured to generate a non-uniform force distribution perpendicular to the longitudinal axis of the elongated body.

13. The tool of claim 10, wherein the first cutting radius differs from the second cutting radius by at least 15 µm.

14. A milling tool comprising:
an elongated body having a longitudinal axis; and
first, second, and third cutting inserts coupled to the body and helically staggered along the longitudinal axis in sequence, and having first, second and third cutting radii, respectively, the second insert disposed between the first and third inserts, the second radius is greater than the first and third radii and the first radius is greater than the third radius.

15. The tool of claim 14, wherein the tool includes at least six cutting inserts coupled to the body and spaced along the longitudinal axis.

16. The milling tool of claim 5, wherein the cartridge is helically-shaped and the plurality of inserts follow the helical shape of the cartridge.

17. The milling tool of claim 10, wherein the cartridge is helically-shaped and the plurality of inserts follow the helical shape of the cartridge.

18. The milling tool of claim 14, wherein the first, second, and third cutting inserts are coupled to the body via a helically-shaped cartridge.

19. The milling tool of claim 18, wherein the first, second, and third inserts follow the helical shape of the cartridge.

20. The milling tool of claim 14, wherein the first, second and third cutting inserts are spaced apart from each other.

* * * * *